United States Patent Office 3,594,423
Patented July 20, 1971

3,594,423
CONVERSION OF VINYLBENZENES TO
ETHYNYLBENZENES
Howard M. Relles, Schenectady, N.Y., assignor to
General Electric Company
No Drawing. Filed Oct. 3, 1969, Ser. No. 863,720
Int. Cl. C07c 15/02
U.S. Cl. 260—668          9 Claims

ABSTRACT OF THE DISCLOSURE

Chlorination of vinylbenzenes leads to a mixture of products rather than only the $\alpha,\beta$-dichloroethyl derivatives, the expected products. In contrast, bromine produces only the expected $\alpha,\beta$-dibromoethyl derivatives. When the mixture of chlorinated products is dehydrohalogenated with most of the dehydrohalogenating agents found useful for the dehydrobromination of the brominated products, a lower yield of the corresponding ethynyl compounds or only partially dehydrochlorinated products are obtained with considerable amounts of chlorinated products remaining unconverted because of their nonreactivity with the dehydrohalogenating agents. However, it has been found that alkali metal amides are capable of completely dehydrochlorinating the mixture of chlorinated products to the desired ethynyl compounds. This permits low cost chlorine to be substituted for the more expensive bromine and provides an economical process for converting vinylbenzenes to the corresponding ethynylbenzenes without the production of undesired by-products. The acetylene products are useful in making polyacetylenes.

This invention relates to a process of converting vinylbenzenes to their corresponding ethynylbenzenes using chlorine in place of bromine as the halogenating agent. More particularly, this invention relates to the chlorination of a vinylbenzene selected from the group consisting of styrene, lower alkyl ring-substituted styrenes, divinylbenzenes, and lower alkyl ring-substituted divinylbenzenes and thereafter dehydrochlorinating the chlorinated products with an alkali metal amide to convert all of the chlorinated products to the ethynylbenzenes.

Polymeric acetylenes and a process for producing the same are disclosed in U.S. Pat. 3,300,456—Allan S. Hay, assigned to the same assignee as the present invention. The polymers from diethynylbenzenes are an extremely interesting group of polymers since they contain over 90% by weight carbon. The monoethynylbenzenes, for example, phenylacetylene, can be used as chain stoppers to regulate the molecular weight of the polymers from the diethynylbenzenes. Furthermore, the ethynylbenzenes are useful in making photosensitive compositions as disclosed in the copending application of Allan S. Hay, Ser. No. 764,287, filed Oct. 1, 1968, and assigned to the same assignee as the present invention.

Because of the wide utility for the polyacetylenic polymers as disclosed in the aforementioned patent and patent application, it would be highly desirable to have an economical process for producing the ethynylbenzenes required as starting materials for the polymers and for the chain terminating, molecular weight regulators.

A general procedure for converting olefins, having at least one hydrogen on each of the two carbon atoms joined by the olefinic double bond, to acetylenes is to halogenate such olefins to produce the corresponding dihaloalkane which is then dehydrohalogenated to the corresponding acetylene. Since chlorine is much more reactive than bromine in halogenation reactions thereby leading to undesirable products in the chlorination step and also since hydrogen bromide is much more easily removed in the dehydrohalogenation step than is hydrogen chloride, bromine has heretofore been the preferred halogen to use in the conversion of olefins to acetylenes.

Acetylenes have also been produced by the dehydrohalogenation of monohaloolefins wherein the halogen is on one of the double bonded carbon atoms. However, many of the required halogenated olefins are not readily available. In this reaction, the position of the halogen atom as well as other substituents on the olefinic group have a marked influence on the course of the reaction if the halogen is chlorine. For example, both $\alpha$- and $\beta$-bromostyrene can be readily dehydrobrominated to yield phenylacetylene with such dehydrohalogenating agents as potassium hydroxide in ethanol or sodium ethoxide. On the other hand, while sodium ethoxide is capable of converting $\alpha$-chlorostyrene to phenylacetylene, it produces $\beta$-ethoxystyrene with $\beta$-chlorostyrene.

Bromine readily adds to styrenes to produce $\alpha,\beta$-dibromoethylbenzenes and to divinylbenzenes to produce bis-($\alpha,\beta$-dibromoethyl)benzenes. These compounds are readily dehydrobrominated with various alkaline agents known to dehydrobrominate aliphatic bromo compounds (for example, alcoholic solutions of sodium or potassium hydroxide or sodium or potassium alkoxides, sodium amide in either inert hydrocarbon or in liquid ammonia, etc.). An undesirable side reaction, especially with sodium amide, leads to considerable debromination to regenerate the olefin rather than dehydrobromination to produce the acetylenic compound. In order to suppress this side reaction, it has been recommended that a two-step procedure be used in which an ethanolic solution of an alkali metal hydroxide or an alkali metal alkoxide be used under mild dehydrohalogenating conditions, for example, in the temperature range of 0–10° C., to produce a monobromo olefin by removal of only one molecule of hydrogen bromide followed by dehydrobromination of the intermediate product under more vigorous conditions, for example, at elevated temperatures up to the reflux temperature to remove the other molecule of hydrogen bromide to produce the desired acetylenic compound.

Whenever chlorine has been substituted for bromine in the above reactions, the yields of the desired acetylenic compounds has always been lower. A good review of these various reactions and the problems encountered is found in Organic Reactions, vol. 5, chapter 1, John Wiley & Sons, Inc., New York (1949) and the references cited therein. In an investigation of the chlorination of styrenes and divinylbenzenes and dehydrochlorination of the chlorinated products to the corresponding mono- and diethynylbenzenes, I have found that chlorination proceeds in a different manner than bromination. Contrary to the bromination reaction wherein bromine readily adds to the double bonds of the vinyl groups to produce only ($\alpha,\beta$-dibromoethyl) groups, chlorination results in a mixture of both ($\alpha,\beta$-dichloroethyl) and ($\beta$-chlorovinyl) groups in the ratio of approximately 2 to 3 of the former to one of the latter. When these mixtures of chlorinated derivatives are dehydrohalogenated with the usual dehydrohalogenating agents, for example, alcoholic solutions of alkali metal hydroxides, alkali metal alkoxides, etc., the $\beta$-chlorovinyl groups do not undergo dehydrohalogenation and remain in the final products. For example, when styrene is chlorinated, the chlorinated mixture contains about 75 mole percent $\alpha,\beta$-dichloroethylbenzene and 25 mole percent $\beta$-chlorostyrene. Chlorination of any of the dinvinylbenzenes produces a mixture of three chlorinated products, the corresponding bis($\alpha,\beta$-dichloroethyl)benzene, $\alpha,\beta$-dichloroethyl-$\beta'$-chlorovinylbenzene and bis($\beta$-chlorovinyl)benzene. Of all the various dehydrohalogenating agents I have tried, only the alkali metal amides, i.e., lithium, sodium, potassium, rubidium and cesium amides, preferably in liquid ammonia, are capable of dehydrochlorinating all of the compounds in the mixture to their corresponding ethynyl compounds. For example, potassium hydroxide at 175° C., potassium t-butoxide in refluxing t-butanol, and potassium t-butoxide in dimethyl sulfoxide at 65° C., are incapable of dehydrochlorinating the $\beta$-chlorovinyl groups. Unexpectedly, alkali metal amides, for example sodium amide, dehydrochlorinates both the $\alpha,\beta$-dichloroethyl groups and the $\beta$-chlorovinyl groups present in the compounds in the above chlorinated mixtures to ethynyl groups. This is indeed surprising since previous workers had found that sodium amide causes considerable debromination rather than the desired dehydrobromination in reactions with 1,2-dibromoethyl compounds. Both Behr et al. in J. Chem. Soc., 1960, 3614 and Miller in J. Org. Chem., 26, 3583 (1961), report that o-divinylbenzene is readily brominated to 1,2-bis($\alpha,\beta$-dibromoethyl)benzene and that this material, when dehydrobrominated with sodium amide in liquid ammonia, produces either an inseparable mixture of o-diethynylbenzene and 1 - ethynyl - 2 - vinylbenzene (2-ethynylstyrene) or only the latter compound depending upon the sodium amide used.

The particular vinyl-substituted benzenes which can be converted to their corresponding ethynyl-substituted benzenes are styrene, o-, m- and p-divinylbenzenes and the lower alkyl ring-substituted derivatives thereof wherein from one up to the total number of hydrogens on the benzene ring are replaced with a lower alkyl substituent for example, methyl, ethyl, propyl, isopropyl, the various butyl isomers, the various amyl isomers, the various hexyl isomers, including cyclohexyl, the various heptyl isomers and the various octyl isomers. Since the alkyl substituents on the benzene ring impart little if any desirable properties to the polymers produced from the ethynyl substituted monomers and in fact lower the total carbon content of the polymers, it is preferable that such alkyl substituents, if present at all, be kept to a minimum of one or two such substituents and preferably have only one to two carbon atoms. The most desirable have no alkyl substituents. Therefore, styrene itself or o-, m-, or p-divinylbenzenes are the preferred starting vinyl-substituted benzenes. Since o-diethynylbenzene when polymerized by itself readily forms cyclic dimer or trimer, its chief use is in the making of copolymers with the other two isomers or with other diacetylenic compounds.

Although I can use any alkali metal amide, i.e., lithium, sodium, potassium, rubidium or cesium amides as the dehydrochlorinating agent, I prefer to use sodium amide since sodium is the most readily available and cheapest of the alkali metals. Furthermore, since the alkali metal amides are extremely reactive with both moisture and carbon dioxide and also, when freshly prepared in liquid ammonia, seem to be more reactive, I prefer to use the amide in liquid ammonia as the dehydrochlorinating agent. However, if desired, I can use the metal amide suspended in an inert organic liquid, for example, benzene, toluene, xylene, mineral oil, etc., by adding the inert solvent to the freshly prepared amide in liquid ammonia and permitting the ammonia to evaporate from the inert solvent, recovering the ammonia for reuse if desired. However, since the dehydrochlorination reaction proceeds so rapidly, even at the temperature of liquid ammonia and the ammonia can be easily recovered after the reaction, there appears to be no incentive to use anything other than liquid ammonia as the medium in which to carry out the dehydrochlorination reactions.

In chlorinating the vinyl-substituted benzenes to the corresponding halogenated derivatives, the reactions should be carried out under chlorine addition conditions, i.e., those conditions which will minimize chlorine replacement reactions wherein chlorine replaces hydrogen of either the vinyl group or the benzene ring. These conditions are well known in the art. Generally, they include carrying out the reactions in the absence of catalysts at, but preferably below, room temperature. Since the chlorine addition reaction is exothermic, cooling, is desirable. Generally, therefore, the chlorine addition reaction is carried out at temperatures of 10° C. or below. I have found that, in the temperature range from −65° C. to 10° C., the mixture of products obtained in the chlorine addition reaction is the same regardless of the temperature used. I have further found that I have not had to intentionally exclude light from the reaction vessel.

Since the alkali-metal amides are so reactive with the chlorinated products the dehydrochlorination reaction proceeds without requiring heating or catalysts. Since the ethynyl compounds produced by this reaction are polymerizable, it should be done so as to minimize or prevent polymerization of any of the product by means well-known in the art, for example by carrying out the reaction under adiabatic means or with cooling, use of polymerization inhibitors, an inert atmosphere, etc. As previously mentioned, liquid ammonia is a good medium for making the alkali-metal amide. Since liquid ammonia at atmospheric pressure will maintain a temperature of −33° C., it provides a means of automatically preventing the dehydrochlorination reaction from overheating. Thus there is this additional reason for preferring to use the alkali-metal amide in liquid ammonia for the dehydrochlorination reaction. However, the other inert solvents previously mentioned can be used if desired and higher temperatures, for example, room temperature or up to the reflux temperature can be used when precautions are taken to prevent loss of product due to polymerization. In this respect the ethynyl compounds do not appear to be as readily polymerizable as the vinyl compounds from which they are prepared. For example, phenylacetylene does not polymerize nearly as easily as styrene.

In order that those skilled in the art may better understand my invention, the following examples are given by way of illustration and not by way of limitation. In all of the examples, parts and percentages are by weight and temperatures are in degrees centigrade unless stated otherwise.

EXAMPLE 1

A solution of 52 g. of styrene in 1000 ml. of hexane was maintained at a temperature of 4–5° C. while chlorine gas was bubbled into the solution. At the end of about 40 minutes, the permanent appearance of the yellow color of excess chlorine indicated that the reaction was complete. Excess chlorine and hydrogen chloride were removed by bubbling a stream of dry nitrogen through the reaction mixture. The solvent was removed under vacuum to give 86.6 g. of chlorinated product. An NMR spectrum of this product showed that it was a 3:1 mole mixture of $\alpha,\beta$-dichloroethylbenzene and $\beta$-chlorostyrene which is apparently the trans-isomer.

An 8 g. portion of the above chlorinated mixture was added dropwise during 10 minutes to 15 g. of potassium hydroxide at 175° C., under nitrogen and under reflux conditions and stirred for an additional 10 minutes at 175°–178° C. By extracting an acidified aqueous solution of the reaction mixture with hexane, an approximately 40:60 mole mixture of $\beta$-chlorostyrene and $\alpha$-chlorostyrene with only a trace amount of the desired phenylacetylene was obtained and identified by NMR spectroscopy. A considerable amount of a brown polymer remained in the reaction flask.

When 10 g. of the above chlorinated mixture was treated with 16 g. of potassium t-butoxide and 200 ml. of t-butanol and the solution refluxed for 1 hour, a molar mixture of 24% $\beta$-chlorostyrene, 71% $\alpha$-chlorostyrene and 5% phenylacetylene was obtained by the extraction procedure described above. When dimethyl sulfoxide was substituted for the t-butanol and the reaction mixture heated at 65° C., under nitrogen for 4 hours, the product isolated by extraction was approximately a molar mixture of 24% β-chlorostyrene, 4% α-chlorostyrene and 72% phenylacetylene. It is to be noted that in the two reactions with potassium t-butoxide, the amount of β-chlorostyrene present in the product mixture is the same as the amount in the starting mixture and that the phenylacetylene has come from the dehydrochlorination of the α,β-dichloroethylbenzene.

EXAMPLE 2

Sodium amide in liquid ammonia was prepared by adding 0.3 g. of ferric nitrate and then 1.0 g. of clean sodium metal to 1200 ml. of liquid ammonia at −33° C. in a 2-liter round bottom flask fitted with a solid carbon dioxide cooled condenser and a stirrer. After 5 minutes, air was bubbled through the solution to destroy the blue color of the dissolved sodium and 22.0 g. of clean sodium metal was added over a period of 30 minutes. After an additional 25 minutes, all of the sodium had been consumed and a gray suspension of sodium amide in the liquid ammonia resulted. There was no longer any blue color due to dissolved sodium. To this suspension, 43.3 g. of the above chlorinated mixture was added dropwise over a period of 75 minutes. After stirring overnight at −33° C., 200 ml. of water was added dropwise over 10 minutes, after which half of the liquid ammonia was allowed to evaporate and 500 ml. of hexane added. The balance of the liquid ammonia was allowed to evaporate and 750 ml. of water was added. After vigorous shaking of the two layers, the aqueous layer was separated and discarded. The hexane solution was washed with 2 N aqueous hydrochloric acid, then with water and dried over anhydrous magnesium sulfate. The product was identified as pure phenylacetylene. No trace of chlorinated products was present.

EXAMPLE 3

Gaseous chlorine was bubbled into a stirred solution of 65.05 g. of m-divinylbenzene in 1000 ml. of hexane, maintained at a temperature of 1 to 3° C. After 110 minutes, the yellow color of chlorine persisted showing that the reaction was completed. Excess chlorine and hydrogen chloride were removed by a stream of nitrogen and the solvent was evaporated under vacuum to yield 121 g. of a mixture identified as 1,3-bis(α,β-dichloroethyl)benzene, 3-(α,β-dichloroethyl)-β-chlorostyrene, and 1,3-bis(β-chlorovinyl)benzene, having a 66:34 mole ratio of α,β-dichloroethyl groups to β-chlorovinyl groups. Further chlorination of the β-chlorovinyl groups with chlorine did not occur.

When bromine was substituted for chlorine in the above reaction, the product was entirely 1,3-bis(α,β-dibromoethyl)benzene. There was no evidence of any partially brominated vinyl groups.

Sodium amide was prepared by adding 0.3 g. of ferric nitrate and then 1.0 g. of clean sodium metal to 1200 ml. of liquid ammonia at −33° C. in a 2-liter round bottom flask fitted with a solid carbon dioxide cooled condenser and a stirrer. After 5 minutes, air was bubbled through the solution to destroy the blue color of the dissolved sodium and 42.6 g. of clean sodium metal was added over a period of 25 minutes. After an additional 90 minutes, all of the sodium had been consumed and a gray suspension of the sodium amide, with no evidence of unreacted sodium was obtained. To this suspension, 60.5 g. of the above chlorinated mixture was added dropwise during 180 minutes. After stirring overnight at −33° C., 100 ml. of water was added slowly. Almost all of the liquid ammonia was allowed to evaporate at which point 500 ml. of hexane and 500 ml. of water was added and the aqueous layer was acidified with hydrochloric acid. After vigorous shaking, the two layers were separated and the hexane layer washed well with water and dried with anhydrous magnesium sulfate. Most of the solvent was distilled at atmospheric pressure on a steam-heated bath leaving a residue of 34.2 g. which was shown by NMR spectroscopy to be a hexane solution containing 26.0 g. of m-diethynylbenzene. This represents an overall yield of 83% based on the starting m-divinylbenzene.

Hay reports in J. Org. Chem. 25, 637 (1960), that divinylbenzenes can be brominated and readily dehydrobrominated to the diethynylbenzenes by treatment of the brominated product with a refluxing solution of potassium t-butoxide in t-butanol for one hour, but this is completely unsatisfactory when chlorine is substituted for bromine in the halogenation of the divinylbenzenes as shown by the following example.

EXAMPLE 4

A solution of 5 g. of the above chlorinated divinylbenzene mixture of Example 3, 15 g. of potassium t-butoxide, and 150 ml. of t-butanol was refluxed for 16 hours, 16 times longer than used by Hay. After isolating the product by extraction, analysis by NMR spectroscopy and vapor phase chromatography showed it to be chiefly a mixture of m-diethynyl benzene, 3-ethynyl-β-chlorostyrene and 3-α-chlorovinyl-β-chlorostyrene, in which the mole ratio of ethynyl groups to β-chlorovinyl groups to α-chlorovinyl groups was 82:15:3. Therefore under these more-than-sufficient dehydrobromination conditions, approximately 50% of the β-chlorovinyl groups originally present in the starting chlorinated mixture had failed to be dehydrochlorinated.

In the same manner as set forth in Examples 1, 2 and 3, lower alkyl ring-substituted styrenes and lower alkyl ring-substituted divinylbenzenes can be chlorinated with chlorine and dehydrochlorinated with sodium amide to their corresponding ethynyl compounds in high yields based on the starting vinyl-substituted benzene. Likewise, the other alkali-metal amides can be used in place of the sodium amide.

As mentioned previously, the phenylacetylenes produced by my process can be used as chain stoppers in regulating the molecular weight of the polymers produced from the diethynylbenzenes, which are also produced by my process. A preparation of such polymers is shown in the above-identified Hay patent which is incorporated herein by reference. Other uses for the ethynylbenzenes prepared by my process will be readily discernible to those skilled in the art. It will also be apparent that various modifications can be made in this invention without departing from the spirit or scope thereof. For example, the chlorination reaction can be carried on at a much lower temperature or even up to room temperature. Other solvents which are inert to chlorine may likewise be used, or, if desired, the starting vinyl compound can be chlorinated in the absence of a solvent and other inert solvents can be used in place of the liquid ammonia for suspending the alkali-metal amide and carrying out the dehydrochlorination. These and other variations are within the intended scope of the invention as set forth in the following claims.

What I claim as new and desire to secure by Letters Patent in the United States Patent Office is:

1. The process of converting a vinyl-substituted benzene to the corresponding ethynyl-substituted benzene which comprises reacting chlorine, under chlorine addition conditions, with a vinylbenzene selected from the group consisting of styrene, lower alkyl ring-substituted styrenes, divinylbenzenes, lower alkyl ring-substituted divinylbenzenes and mixtures thereof, and thereafter dehydrochlorinating the chlorinated products with an alkali metal amide.

2. The process of claim 1 wherein the dehydrochlorination reaction is carried out in liquid ammonia.

3. The process of claim 1 wherein the alkali metal amide is sodium amide.

4. The process of claim 1 wherein sodium amide in liquid ammonia is used for the dehydrochlorination reaction.

5. The process of claim 1 wherein the vinyl-substituted benzene is styrene.

6. The process of claim 5 wherein sodium amide in liquid ammonia is used for the dihydrochlorination reaction.

7. The process of claim 1 wherein the vinyl-substituted benzene is divinylbenzene.

8. The process of claim 7 wherein sodium amide in liquid ammonia is used for the dehydrochlorination reaction.

9. The process of claim 8 wherein the divinylbenzene is selected from the group consisting of m-divinylbenzene, p-divinylbenzene and mixtures thereof.

References Cited
UNITED STATES PATENTS

| | | | |
|---|---|---|---|
| 2,657,244 | 10/1953 | Barney et al. | 260—668R |
| 3,204,004 | 8/1965 | Sexton | 260—668R |
| 3,303,229 | 2/1967 | De Rosset | 260—668R |
| 3,427,354 | 2/1969 | Viehe | 260—668R |

DELBERT E. GANTZ, Primary Examiner

V. O'KEEFE, Assistant Examiner